Dec. 19, 1961     H. R. WEST     3,014,191
ROTOR ASSEMBLY FOR INDUCTION VOLTAGE REGULATOR
Filed May 2, 1956
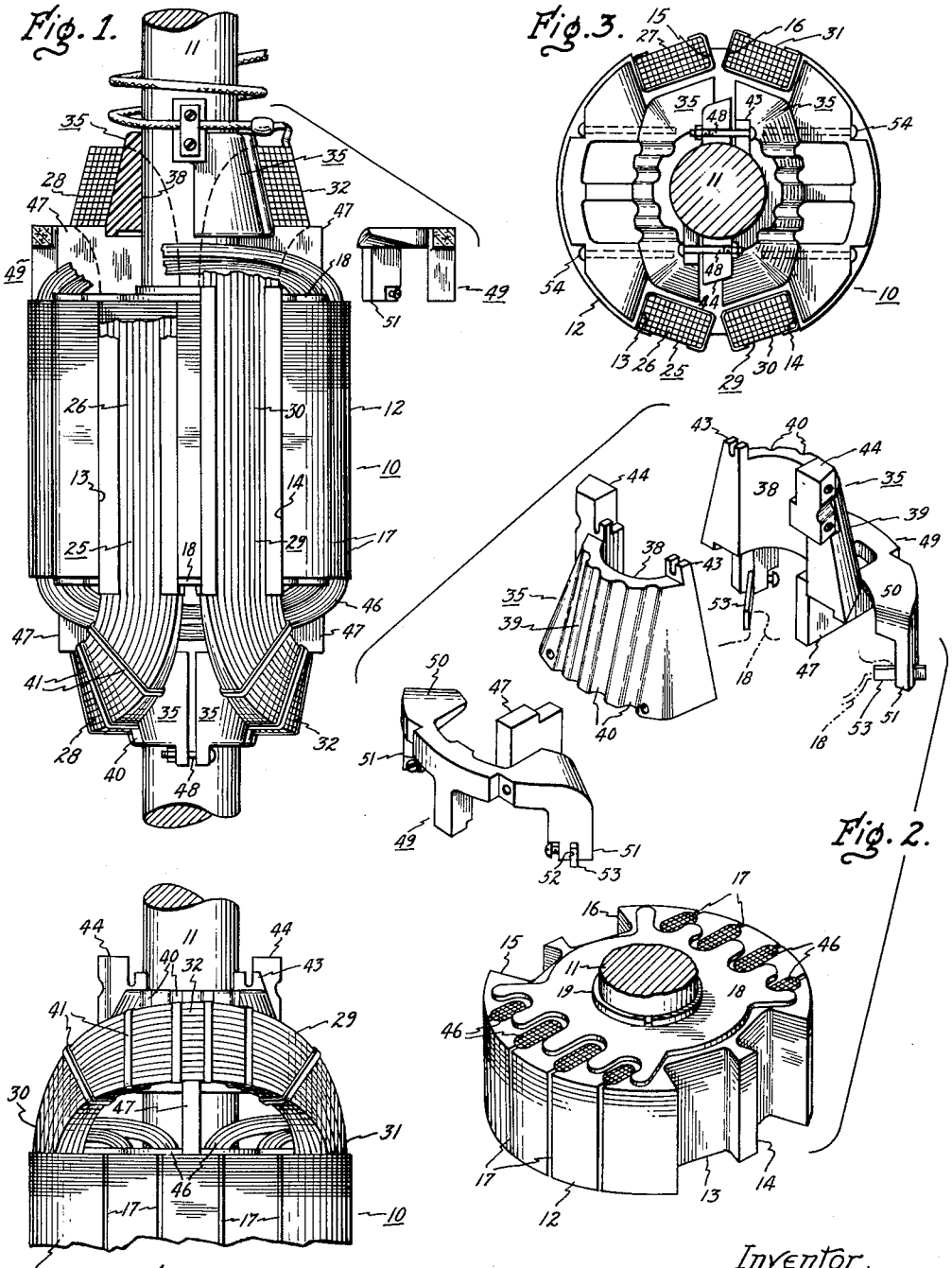
Inventor.
Harry R. West,
by Gilbert P. Tarleton
His Attorney.

United States Patent Office 3,014,191
Patented Dec. 19, 1961

3,014,191
ROTOR ASSEMBLY FOR INDUCTION VOLTAGE REGULATOR
Harry R. West, Pittsfield, Mass., assignor to General Electric Company, a corporation of New York
Filed May 2, 1956, Ser. No. 582,170
12 Claims. (Cl. 336—120)

This invention relates to induction voltage regulators, and more in particular to an improved rotor assembly for induction voltage regulators.

Induction voltage regulators of one type are comprised of a stator having a plurality of coils and a rotor also having a plurality of coils and mounted for rotation in inductive relationship with the stator. The rotor windings are generally comprised of a pair of layer wound primary windings and a number of random wound short circuited windings.

In the past, the primary windings have been preformed and then positioned in slots in the magnetic laminations of the rotor. In the previously employed method for winding the primary rotor coils, the coils were first wound on suitably shaped forms, such as wooden forms having the desired shape, the wires being placed manually in layers so as to form a coil of approximately rectangular section. During this winding operation, resin coated paper was placed between the layers of the winding, the edges of the resin coated paper extending beyond the sides of the coil. The extending edges of the resin coated paper were then bent over in overlapping relationship, and the coil was provided with sufficient taping to hold the wires in place until the coils were molded. The coils were then transported to another area where the straight portions (or legs) of the coil were clamped in steam heated molds to cause the resin coating of the papers between the winding layers to be cured, thus solidifying the winding assembly and insulating material in the leg into a solid mass of rectangular cross section of predetermined dimensions. The size and shape of the coils generally prevented the heat treating of more than one leg of a coil at a time.

Following the molding operation, the coils were manually wrapped with a plurality of layers of insulation, such as paper or tape, for the purpose of providing ground insulation for the coil.

The coils were then transported to another area for insertion in the rotor of the voltage regulator. The rotor had been previously supplied with short circuit and control windings (if desired). To put a coil on the rotor, one side of the coil was first forced into one rectangular rotor slot which had been lined with paper to prevent mechanical damage to the insulated coil and leg. Then the other side of the coil was manually pulled into position substantially above another rectangular slot, and forced into the other slot.

The operation of pulling the coil over into the second slot of the structure distorts the end portions of the coil. Hence it has been necessary that the coil ends be made sufficiently long to permit the necessary distortion without damage to the structure of the coil and insulation. The ends of the coil were then secured to an insulation ring on each end of the armature and coaxial with the armature shaft. These insulation rings were provided in order to prevent deformation of the coil under short circuit conditions which tend to force the ends of the coil toward the axis of the armature.

Besides the costly operations required in order to form the coils of previous rotors, several disadvantages were inherent in such structures. As has been previously stated, it was necessary that the coils extend for a sufficient distance beyond the ends of the slots in the magnetic laminations so that damage did not occur to the coils as a result of stretching. The necessary extension of the windings for this purpose was relatively large in relation to the portions of the windings axially in the armature slots, and for primary windings having side portions disposed in slots in the core nearly 180 degrees apart on the circumference of the core (i.e. having a span of about 180 degrees), it was necessary that each winding have a minimum axial extension beyond each end of the core equal to at least 0.7 times the diameter of the core. The required extension was not substantially affected by the length of the useful portions of the windings, so that in smaller size regulators the total required extension distance was greater than the useful distance of the winding.

The axial extensions of the windings comprised straight extensions from the side portions of the windings in the core slots, and the straight portions of the axial extensions were joined by portions that followed generally the circumference of the core. This shape for the axial extended portions was provided so that flexibility of the end portions would not be lost, and also so that circular end support means could be employed. Other shapes would have reduced the winding flexibility, and therefore necessitated even further axial extension of the windings, as well as more costly support members.

By thus extending the windings, the cost is increased due to the additional copper that is required. The additional length of the windings also necessitated lengthening of all other parts of the regulator. Besides the additional cost resulting therefrom due to increased cost of materials and handling, the rotor structure was also mechanically weakened. The increased length required in the rotor shaft increased the tendency of rotor "pullover," that is, the tendency of the rotor to strike the stator due to magnetic forces caused by unbalanced air gap. Any increase in the length of the rotor shaft is highly undesirable in regard to the pullover effect, since the stiffness of the rotor varies inversely as the third power of its length.

Due to the extended length portions of the windings, the tendency for the rotor to be damaged by short circuit conditions was increased since it was difficult to accurately support the long extensions. Another disadvantage of the previously employed structure was that special precautions had to be taken in order to prevent damage to the coils during the process of inserting the coils in the rotor slots. It was generally necessary to manually pound the coils in the slots with mallets.

Under short circuit conditions there generally are large tangential forces on the end portions of the windings tending to shift them angularly with respect to the magnetic axis. No very practical way has been found to support the coil ends against this rotational movement, and dependence has had to be placed only on the stiffness of the coil ends themselves. This imposed a severe limitation on the magnitude of short circuit current to which the regulator could safely be subjected. It is therefore an object of this invention to provide an improved rotor for an induction voltage regulator.

It is also an object to provide an improved method for fabricating induction voltage regulator rotors, the improved method eliminating excessive handling of the windings such as was inherent in the previously described practice.

It is also an object of this invention to provide a rotor for an induction voltage regulator characterized by a minimum extension of the primary windings beyond the ends of the magnetic core laminations.

A still further object is to provide an improved rotor for induction voltage regulators, the rotor having primary windings extending for a minimum distance beyond the ends of the rotor magnetic core laminations, the rotor structure being characterized by the decreased tendency to pull over, decreased tendency for the structure to collapse as a result of short circuit forces, and decreased tendency to fail under conditions of short circuit.

Still another object of this invention is to provide an induction voltage regulator having a rotor characterized by reduced primary coil length, reduced magnetic core rotor length, reduced overall shaft length, and increased mechanical stability, the aforesaid advantages being accomplished by the rotor being structurally adapted for winding of the primary coils directly in the rotor slots.

While the specification concludes with claims particularly pointing out and distinctly claiming the subject matter which I regard as my invention, it is believed that the invention will be better understood from the following description taken in connection with the accompanying drawing in which:

FIG. 1 is a partially cross sectional view of the rotor of an induction voltage regulator according to my invention, FIG. 2 is an exploded view of several components of the rotor of FIG. 1, and illustrating the rotor magnetic core and temporary and permanent winding forms, FIG. 3 is an end view of the induction voltage regulator rotor of FIG. 1, and FIG. 4 is a view of a portion of the rotor of FIG. 1, the view of FIG. 4 illustrating the rotor from a different angular direction and not having the primary winding cross sectioned.

Briefly stated, and in accordance with one aspect of my invention, I provide a rotor for an induction voltage regulator, the rotor comprising a central shaft means, and having a cylindrical magnetic core coaxial with and rigidly affixed to the shaft means. The core may conventionally be comprised of a plurality of substantially circular magnetic laminations, the planes of the laminations being perpendicular to the axis of the shaft means. A plurality of longitudinally extending slots are provided in the cylindrical surface of the core, and a layer winding is provided having side portions in two of the slots and end portions joining the side portions. The end portions of the winding lie radially inwardly of the side portions of the winding with respect to the axis of the shaft means, the end portions preferably having decreasing radii away from the core with respect to the shaft means. Frustoconical form members may be provided in order to support the end portions of the winding.

The primary windings are preferably formed by winding them directly on the rotor. Previously it had not been thought possible or practicable to so form the primary windings of induction voltage regulators. As will be more fully explained in the following paragraphs, the rotor structure of my invention has a reduced primary coil length, reduced magnetic core rotor length, reduced overall shaft length, increased mechanical stability, decreased tendency of winding collapse as a result of short circuit forces, decreased tendency to fail under short circuit conditions, and also a decreased tendency to pull over. These advantages are accomplished by a winding method having fewer steps and reduced danger of coil damage as compared with the previously described method that has been employed in the past for winding induction voltage regulator rotor coils.

Referring now to the drawing, and more particularly to FIG. 1, therein is illustrated a rotor 10 of an induction voltage regulator. The rotor 10 has a central shaft 11, the shaft 11 being mounted for rotation by conventional means (not illustrated for the sake of clarity of the drawing). A cylindrical core 12 is provided on the shaft means 11 and is rigidly affixed thereto. The core 12 is positioned coaxially with the shaft 11, and may be comprised of a plurality of substantially circular magnetic laminations, the planes of the laminations being perpendicular to the axis of the shaft 11.

The rotor core 12 may be more clearly seen in FIG. 2, wherein it is shown that the core 12 has a plurality of longitudinally extending substantially rectangular slots 13, 14, 15, and 16 and a plurality of slots 17 of generally rounded cross section. The laminations of the core 12 are held together between end plates 18, the end plates 18 being held in position with respect to the shaft 11 by means of split rings 19 in grooves in the shaft 11.

As illustrated in FIG. 2, the slots 13 and 14 are adjacent each other, and the slots 15 and 16 are adjacent each other, the two groups of rectangular shaped slots being separated on both sides by the same number of slots 17. The two groups of rectangular shaped slots are disposed on opposite sides of the shaft 11 and are arranged so that the half of the core containing the slots 13 and 15 is substantially symmetrical with the half of the core containing slots 14 and 16, and so that the pair of slots 13 and 15 are nearly 180 degrees apart on the circumference of the core, and similarly the pair of slots 14 and 16 are substantially 180 degrees apart on the circumference of the core.

Referring now to FIGS. 1 and 3, a layer winding 25 comprised of a plurality of layers of individual conductor strands is provided on the rotor, and has one side portion 26 disposed in the slot 13 another side portion 27 disposed in the slot 15, and a pair of end portions 28 joining the respective ends of the side portions 26 and 27. Similarly, a layer type primary winding 29 is provided having a side portion 30 disposed in the slot 14, a side portion 31 disposed in the slot 16, and a pair of end portions 32 joining the respective ends of the side portions 30 and 31. The end portions 28 and 32 of the primary windings 25 and 29 respectively, are disposed radially inwardly of the side portions of these windings with respect to the shaft 11, preferably in the manner hereinafter disclosed.

As illustrated in FIG. 1, the split frustoconical members 35 are provided spaced from each end of the core 12, and disposed coaxially with the shaft 11. The frustoconical members 35 have decreasing radii away from the core 12 with respect to the shaft 11. The end portions 28 and 32 are disposed radially adjacent the longitudinal or curved surfaces of the support members 35, so that in each layer of the primary windings 25 and 29 the conductor turns in the end portions thereof are disposed at progressively decreasing radii away from the core with respect to the shaft 11. As illustrated in FIG. 1, this may result in the cross section of the end portions of the primary windings having a parallelogram shape, the sides of the windings cross section being in planes substantially perpendicular to the axis of the shaft 11.

The frustoconical form members may be more clearly seen in FIG. 2 wherein it is illustrated that the radially inward surfaces 38 are rounded to fit around the shaft 11. The longitudinal or curved outer surfaces 39 are preferably provided with a plurality of longitudinally extending grooves 40. The grooves may be conveniently employed to facilitate the taping of the primary windings with string or tape, as illustrated in FIG. 4, the tape 41 passing around the windings and through the grooves 40. The grooves 40 also serve as cooling ducts for the end portions of the windings. Still referring to FIG. 2, slotted projections 43 extend from the smallest end of the members 35, and as will be disclosed in more detail later, are arranged so that bolts may be passed through the slots in order to hold the members 35 in place during winding of the coils. The support members 35 also have clamping projections 44 extending from their smallest ends. These clamping projections 44 may have grooves extending transversely of the axis of the shaft 11, and as illustrated in FIG. 1 and are employed to clamp the conductors connected to the primary winding of the rotor.

As illustrated in FIGS. 1 and 4 short circuit windings 46 may be provided in the slots 17 of the core, the axis of the short circuit windings 46 being perpendicular to the axis of the primary windings 25 and 29. Support blocks 47 may be provided between the ends of the core and the end portions of the primary windings 25 and 29 to prevent axial collapse of the windings.

In the fabrication of the induction voltage regulator rotor of my invention, the rotor core 12 is first provided with random wound short circuit windings 46 according to the conventional practice of random winding these windings directly on the rotor. Then the frustoconical support members 35 are clamped around the shaft by means of bolts 48 passing through the slotted projections 43. The frustoconical members 35 serve to radially support the end portions of the primary windings. Then the support blocks 47 may be placed in position, and auxiliary winding supports 49 placed in position on the ends of the rotor for axially supporting the primary windings during the winding process.

The auxiliary forms 49 have a curved surface 50 following the desired contour of the coil, and a number of projections 51 for spacing the contoured surface 50 the desired distance from the ends of the core 12. In order to hold the auxiliary supports 50 in place during the winding, slots 52 may be provided in the projections 51, and small plates 53 passing through the slots 51 are held against the end support plates 18 of the core 12 by means of screws threaded into the slotted ends of the extensions 51 of auxiliary supports 50. Bolts 54 (FIG. 3) may also extend through the auxiliary supports 50 to provide additional support and also to correctly space the frustoconical support members 35 the desired distance from the ends of the core 12.

The primary windings 25 and 29 are then layer wound directly into the rectangular slots in the core 12, the frustoconical support members 35 and auxiliary supports 50 serving as forms for the end portions of the winding. The winding may be accomplished in a similar manner to that previously employed in winding of such coils on forms prior to insertion in the core, with necessary insulation being provided between the layers of the winding and the winding and the core 12. It is not necessary, however, to employ resin coated insulation in the windings, since as has been previously stated, the resin coated insulation served only to hold the windings in shape prior to insertion in the slots of the rotor. After the primary windings have been wound in the slots of the core, the end portions of the windings may be taped with string or tape 41 as illustrated in FIG. 4, the tape of the portions of the winding lying radially against the frustoconical support members 35 passing through the grooves 40 in the frustoconical support members 35 when the winding has been completed, the auxiliary support members 50 which served to guide the windings in the axial direction, are removed. The bolts 48 which held the frustoconical support members 35 together may also be removed, since now the windings 25 and 29, and the support blocks 47 firmly hold the support members 35 in place.

The winding of the primary windings on the core directly takes about the same length of time as had been previously required to wind the windings on wooden forms, since the same care must be exercised and insulation must be provided between the individual layers. Now, however, as has been stated, it is not necessary to employ resin coated insulation. It is also not necessary to bond the windings together, manually wrap the coil sides or pound the windings into the armature slots.

Since the new primary windings are wound directly on the armature, it is not necessary to provide the length of the end portions as had previously been required to enable the flexing of the coil. Therefore, the windings of the rotor according to my invention are considerably shorter than was previously the case. The maximum axial extension of the end portions of the rotor according to my invention is less than about 5.0 times the diameter of the rotor.

The reduction in the axial length of the windings obviously results in a decrease in the resistance of the conductor if the size of the wire is not changed. The size of wire may therefore be decreased correspondingly without increasing the $I^2R$ losses of the winding, and this makes possible an increase in the number of turns that may be wound into the available space in the rotor core. This increase in the number of turns in the primary windings results in a decrease in the amount of magnetic flux in the core. The axial or stack length of the core can therefore be materially reduced without increasing the core loss. The shortening of the core enables a further shortening of the length of the primary winding turns which in turn makes possible a further reduction in the wire size. This compounding effect of benefits has made possible a reduction of about 20% in the total weight of copper and steel that is required in a regulator of a given rating, as compared with the weights required in previous constructions, without any increase in losses.

In previous windings, it has been found that under short circuit conditions, sufficient collapsing force of these windings may be present to break the support rings at the end portions of the windings, thereby permitting the opposite coils to contact each other and result in extreme damage to the regulator. In the arrangement according to my invention, however, the end portions of the windings have a considerably shorter moment on than previously, and are also backed up by a solid frustoconical member, As a further advantage, since the new coils according to my invention are preferably formed on a frustoconical member, their end portions are separated more widely from the stator coils, and consequently do not have as much force exerted on them as previously under short circuit conditions.

As a still further advantage, the shaft of the rotor of my invention may be much stiffer than previously since its end bearings may be considerably closer together, the stiffness of the rotor shaft varying inversely as the third power of its length. The tendency of the armature to pull over and strike the stator due to magnetic forces caused by unbalanced air gaps is therefore considerably reduced.

In the rotor of my invention, the inherent stiffness of the coil ends is so greatly increased because of the shortened axial extension, that the coil end stiffness is no longer a limiting factor in determining the short circuit capability of the regulator. For example, in previous regulators rated from 50 to 100 kva., it has been found that a maximum of only about 70,000 ampere turns per pole was all that the coils could stand without serious damage. With the construction of my invention, tests have shown that the coil ends can successfully withstand at least 120,000 ampere turns per pole.

The method of fabricating the rotor of an induction voltage regulator according to my invention therefore provides an induction voltage regulator rotor that is physically shorter in length than previous rotors, and also stiffer than previous rotors. The structure is much less susceptible to mechanical damage due to short circuit forces. These are advantages that are provided without increasing the excitation loss characteristics of the regulator, and are also accompanied with a decrease in cost of labor and materials in fabricating the regulator.

It will be understood, of course, that while the form of the invention hereinafter shown and described constitutes a preferred embodiment of my invention, it is not intended herein to illustrate all of the possible equivalent forms or ramifications thereof. It will also be understood that the words employed are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. A rotor for an induction voltage regulator comprising shaft means, a cylindrical magnetic core coaxial with and rigidly affixed to said shaft means, longitudinal slots on said core, and at least one layer winding having side portions in two of said slots and end portions joining said side portions, a frustoconical form member on each end of said core and coaxial with said shaft means, said form members having decreasing radii away from said core, substantially the entire end portions of said winding lying against said form members.

2. A rotor for an induction voltage regulator comprising shaft means, a cylindrical magnetic core coaxial with and rigidly affixed to said shaft means, a plurality of longitudinal slots on said core, and at least one layer winding of a plurality of winding turns, said winding having side portions in two of said slots and end portions joining said side portions, the two said slots being nearly 180 degrees apart on the circumference of said core, a frustoconical form member on each end of said core and coaxial with said shaft means, said end portions lying radially against said form members, the maximum axial extension of each of said end portions beyond said core being less than about 0.5 times the diameter of said core.

3. A rotor for an induction voltage regulator comprising shaft means, a cylindrical magnetic core coaxial with and rigidly affixed to said shaft means, a plurality of longitudinal slots in said core, said slots having substantially rectangular cross sections, and first and second layer windings of a plurality of layers of individual turns each and having a common axis normal to the axis of said shaft means, said windings being disposed on opposite sides of said shaft means, said windings each having two side portions disposed in said slots and end portions joining said side portions, frustoconical support members spaced from each end of said core coaxial with said shaft means, said support members having decreasing radii away from said core, substantially the entire radially innermost layers of the end portions of said windings lying against the longitudinal surfaces of said support members.

4. The rotor of claim 3 in which the maximum axial extension of each of said end portions beyond said core is less than about 0.5 times the diameter of said core.

5. A rotor for an induction voltage regulator comprising shaft means, a cylindrical magnetic core coaxial with and rigidly affixed to said shaft means, a plurality of longitudinal slots in said core, said slots having substantially rectangular cross sections, and first and second layer windings of a plurality of layers of individual turns each and having an axis normal to the axis of said shaft means, said windings being disposed on opposite sides of said shaft means, said windings each having two side portions of substantially rectangular cross section disposed in said slots and two end portions joining said side portions, frustoconical support members coaxial with said shaft means and spaced from each end of said core, said support members having decreasing radii away from said core, the radially innermost layers of the end portions of said windings lying against the longitudinal surfaces of said support members, said end portions having parallelogram shaped cross sections.

6. The rotor of claim 5 in which the maximum axial extension of each of said end portions beyond said core is less than about 0.5 times the diameter of said core.

7. A rotor for an induction voltage regulator comprising shaft means, a cylindrical magnetic core coaxial with and rigidly affixed to said shaft means, a plurality of longitudinal slots in said core, said slots having substantially rectangular cross sections, and first and second layer windings of a plurality of turns of individual turns each and having an axis normal to the axis of said shaft means, said windings being disposed on opposite sides of said shaft means, said windings each having two side portions of substantially rectangular cross section disposed in said slots and two end portions joining said side portions, the span of each of said windings on the circumference of said core being nearly 180 degrees, frustoconical support members coaxial with said shaft means and spaced from each end of said core, said support members having decreasing radii away from said core, the radially innermost layers of said end portions of said windings lying against the longitudinal surfaces of said support members, said end portions having parallelogram shaped cross sections.

8. A rotor for an induction voltage regulator comprising a central rotatable shaft, a cylindrical magnetic core of a plurality of stacked laminations coaxial with and rigidly affixed to said shaft, a plurality of longitudinal slots in said core, first and second layer windings of a plurality of individual turns each and having a common axis normal to the axis of said shaft, said layer windings being disposed on opposite sides of said shaft means, said layer windings each having two side portions of substantially rectangular cross section disposed in said slots and two end portions joining said side portions, random windings in said slots having an axis normal to the axes of said shaft and layer windings, frustoconical support members coaxial with said shaft and spaced from the ends of said core, said support members having decreasing radii away from said core, the radially innermost layers of said end portions of said layer windings lying against the longitudinal surfaces of said support members, said end portions having parallelogram shaped cross sections, and cable clamp means on said support members.

9. The rotor of claim 8 in which the maximum axial extension of each of said end portions beyond said core is less than about 0.5 times the diameter of said core.

10. The rotor of claim 8 in which said support members are split and have longitudinal grooves in their longitudinal surfaces.

11. A method for winding the rotor of an induction voltage regulator of the type having a cylindrical core with a plurality of longitudinal slots comprising random winding short circuit windings directly in some of the slots of said core, placing separate forms adjacent the ends of said core for guiding primary windings in axial and radial directions with respect to the axis of said core, layer winding primary windings directly in the slots in said core and against said forms, and removing the axially guiding forms.

12. A method for winding the rotor of an induction voltage regulator of the type having a cylindrical core mounted coaxially on a shaft and having a plurality of longitudinally extending slots comprising random winding short circuit windings in some of said slots of said core, placing frustoconical forms spaced from the ends of said core coaxial with said shaft, placing other forms adjacent the ends of said core for axially guiding primary windings, layer winding primary winding directly in other slots of the core and against the forms, and removing the other said forms.

References Cited in the file of this patent

UNITED STATES PATENTS

| | | |
|---|---|---|
| 712,463 | Steinmetz | Oct. 28, 1902 |
| 1,672,703 | West | June 5, 1928 |

UNITED STATES PATENT OFFICE

CERTIFICATE OF CORRECTION

Patent No. 3,014,191                      December 19, 1961

Harry R. West

It is hereby certified that error appears in the above numbered patent requiring correction and that the said Letters Patent should read as corrected below.

Column 5, line 71, for "5.0" read -- 0.5 --.

Signed and sealed this 1st day of May 1962.

(SEAL)
Attest:

ERNEST W. SWIDER                      DAVID L. LADD
Attesting Officer                      Commissioner of Patents